(12) United States Patent
Li et al.

(10) Patent No.: US 11,390,530 B2
(45) Date of Patent: Jul. 19, 2022

(54) METHOD FOR PREPARING POROUS INORGANIC PARTICLES

(71) Applicant: Amorepacific Corporation, Seoul (KR)

(72) Inventors: Yan Li, Yongin-si (KR); Hyunsuk Lee, Yongin-si (KR); Jaewon Yoo, Yongin-si (KR); Yongjin Kim, Yongin-si (KR); Gi-Ra Yi, Suwon-si (KR); Yi-Rang Lim, Suwon-si (KR); Seung-hyun Kim, Daejeon (KR)

(73) Assignee: Amorepacific Cornoration, Seoul (KR)

( * ) Notice: Subject to any disclaimer, the term of this patent is extended or adjusted under 35 U.S.C. 154(b) by 287 days.

(21) Appl. No.: 16/618,274

(22) PCT Filed: May 30, 2018

(86) PCT No.: PCT/KR2018/006133
§ 371 (c)(1),
(2) Date: Nov. 29, 2019

(87) PCT Pub. No.: WO2018/221951
PCT Pub. Date: Dec. 6, 2018

(65) Prior Publication Data
US 2021/0155487 A1 May 27, 2021

(30) Foreign Application Priority Data
Jun. 2, 2017 (KR) .................. 10-2017-0068849

(51) Int. Cl.
*C01B 33/18* (2006.01)
*B01J 13/00* (2006.01)
(Continued)

(52) U.S. Cl.
CPC .......... *C01B 33/18* (2013.01); *B01J 13/0047* (2013.01); *C01G 1/02* (2013.01); *C01G 23/047* (2013.01);
(Continued)

(58) Field of Classification Search
CPC ........ C01B 33/18; B01J 13/0047; C01G 1/02; C01G 23/047; C01P 2004/02;
(Continued)

(56) References Cited

U.S. PATENT DOCUMENTS 6,680,013 B1 1/2004 Stein et al.
9,368,801 B2 * 6/2016 Moon ................. H01M 4/8657
(Continued)

FOREIGN PATENT DOCUMENTS

JP 2011-1205 A 1/2011
JP 2011-51802 A 3/2011
(Continued)

OTHER PUBLICATIONS

Espacenet Machine Translation of KR 101394544B1 (2021) (Year: 2021).*
(Continued)

*Primary Examiner* — Anthony J Zimmer
*Assistant Examiner* — Logan Edward Laclair
(74) *Attorney, Agent, or Firm* — Sughrue Mion, PLLC

(57) ABSTRACT

A method for preparing porous inorganic particles is disclosed. The method includes the steps of: (a) preparing an emulsion comprising an inorganic precursor and a polar solvent; (b) adding an organic solvent to the emulsion of step (a) to swell emulsion particles; (c) mixing the swollen emulsion of step (b) with polymer particles having a positive charge on the surface thereof; (d) adding a surfactant to the mixture of step (c) and removing the organic solvent; (e) adding an initiator to the result of step (d) to polymerize the same; and (f) firing the result of step (e) to remove the polymer particles so as to form macropores.

14 Claims, 11 Drawing Sheets

(51) Int. Cl.
*C01G 1/02* (2006.01)
*C01G 23/047* (2006.01)

(52) U.S. Cl.
CPC ...... *C01P 2004/02* (2013.01); *C01P 2004/03* (2013.01); *C01P 2004/04* (2013.01); *C01P 2004/84* (2013.01); *C01P 2006/16* (2013.01)

(58) Field of Classification Search
CPC .............. C01P 2004/03; C01P 2004/04; C01P 2004/84; C01P 2006/16
See application file for complete search history.

(56) References Cited

U.S. PATENT DOCUMENTS

| | | |
|---|---|---|
| 2013/0273460 A1 | 10/2013 | Moon et al. |
| 2014/0159025 A1 | 6/2014 | Fukuoka et al. |
| 2016/0089334 A1 | 3/2016 | Nakayama et al. |
| 2016/0361248 A1 | 12/2016 | Vidal et al. |

FOREIGN PATENT DOCUMENTS

| | | |
|---|---|---|
| JP | 2014-122147 A | 7/2014 |
| KR | 10-2007-0024435 A | 3/2007 |
| KR | 10-20080010187 A | 1/2008 |
| KR | 10-2012-0029752 A | 3/2012 |
| KR | 10-2013-0125479 A | 11/2013 |
| KR | 10-2014-0004939 A | 1/2014 |
| KR | 101394544 B1 * | 5/2014 |
| KR | 10-2015-0059679 A | 6/2015 |
| KR | 10-2016-0014319 A | 2/2016 |
| KR | 10-1625801 B1 | 5/2016 |
| KR | 10-2017-0006077 A | 1/2017 |
| WO | 2014/024379 A1 | 2/2014 |
| WO | 2014/188924 A1 | 11/2014 |
| WO | WO-2019131658 A1 * | 7/2019 ........... C01B 33/193 |

OTHER PUBLICATIONS

Yinyan Guan, et al., "Hollow Microsphere with Mesoporous Shell by Pickering Emulsion Polymerization as a Potential Colloidal Collector for Organic Contaminants in Water", Langmuir, 2014, pp. 3681-3686, vol. 30.

Zhaoxia Chen, et al., Preparation of $PSt/SiO_2$ nanoparticles with raspberry-like structure via nonionic surfactant miniemulsion polymerization', Journal of Adhesion Science and Technology, 2015, pp. 2117-2129, vol. 29, No. 19.

Young-Sang Cho, et al., "Spherical meso-macroporous silica particles by emulsion-assisted dual-templating", Materials Express, 2014, pp. 91-104, vol. 4.

Sin Young Lee, et al., "Morphology and Particle Size Distribution Controls of Droplet-to-Macroporous/Hollow Particles Formation in Spray Drying Process of Colloidal Mixtures Precursor", Aerosol Science and Technology, 2009, pp. 1184-1191, vol. 43.

International Search Report for PCT/KR2018/006133 dated Sep. 27, 2018 [PCT/ISA/210].

Communication dated Mar. 15, 2022 from the Japanese Patent Office in Japanese Application No. 2019-566699.

* cited by examiner

METHOD FOR PREPARING POROUS INORGANIC PARTICLES

CROSS-REFERENCE TO RELATED APPLICATION

This application is a National Stage of International Application No. PCT/KR2018/006133, filed on May 30, 2018, which claims priority to Korean Patent Application No. 10-2017-0068849, filed on Jun. 2, 2017, and all the benefits accruing therefrom under 35 U.S.C. § 119, the contents of which in its entirety are herein incorporated by reference.

TECHNICAL FIELD

The present specification relates to a method for preparing porous inorganic particles.

BACKGROUND ART

Ultraviolet radiation, which is sunlight with a wavelength between 200 nm and 400 nm, can exert a potentially harmful effect depending on the intensity and time of exposure. It is classified into UVC (200-290 nm), UVB (290-320 nm), and UVA (320-400 nm) according to the wavelength. UVC has a lethal effect on life when directly applied to the skin. However, it does not reach the ground because it is absorbed by the ozone layer. On the other hand, exposure to UVB can cause burns, and UVA can penetrate the dermal layers of the skin, causing skin cancer and aging. In fact, photoaging is known to account for more than 70-80% of skin aging. Thus, sunscreens have become an indispensable product for modern people. As a result, various types of cosmetics with UV protection and absorption functions is being actively developed.

Sunscreens are mainly classified into chemical sunscreens and physical sunscreens. Chemical sunscreens absorb ultraviolet radiation to protect the skin from ultraviolet radiation. Aromatic substances such as avobenzone or oxybenzone are mainly used for chemical sunscreens. Although chemical sunscreens have the advantage of being transparent, they have poor light stability and cause skin side effects such as allergies. Physical sunscreens block ultraviolet radiation through reflection and scattering of ultraviolet radiation by using their refractive index. Titanium dioxide, zinc oxide, etc. are used as physical sunscreens. Although physical sunscreens have a high stability on the skin and effectively block UVA and UVB, they may cause a white cast when applied to the skin.

Studies are also being conducted on inorganic nanoparticles of 100 nm or less. However, it was found that they are absorbed into the body to cause phototoxicity. In order to solve this problem, micrometer-sized particles obtained by assembling nanoparticles were used. However, they are likely to decompose, which may again cause a problem of absorption into the body.

Conventionally known is a method for forming porous particles using a micelle formed from surfactants as a pore template. However, this method only allows to form mesopores of 0-30 nm, and has difficulty in forming pores having a uniform size and regularly arranged.

Thus, there is a need for porous inorganic particles the reflection and absorption wavelengths of which can be adjusted and which do not cause phototoxicity concerns.

SUMMARY OF INVENTION

Technical Problem

In one aspect, an object of the present invention is to provide a method for preparing spherical porous inorganic particles which are uniform and regular in pore size and pore arrangement.

In another aspect, an object of the present invention is to provide a method for preparing porous inorganic particles including pores whose size can be adjusted without deformation in the spherical shape of the particles formed.

In another aspect, an object of the present invention is to provide a method for preparing spherical porous inorganic particles including macropores of 50 nm or more.

In another aspect, an object of the present invention is to provide a method for preparing spherical porous inorganic particles including macropores of 50 nm or more which are uniformly arranged.

In another aspect, an object of the present invention is to provide a method for preparing spherical porous inorganic particles including macropores having a uniform pore size of 50 nm or more.

In another aspect, an object of the present invention is to provide a method for preparing spherical porous inorganic particles that allow to adjust the wavelength region of the light to be absorbed or reflected, based on the size of the pores.

In another aspect, an object of the present invention is to provide a method for preparing spherical porous inorganic particles that can reflect light in the visible light region as well as UV radiation, by adjusting the distance between the pore centers.

In another aspect, an object of the present invention is to provide a method for preparing porous inorganic particles capable of effectively reflecting ultraviolet radiation.

In another aspect, an object of the present invention is to provide a method for preparing porous inorganic particles with no phototoxicity.

Solution to Problem

In one aspect, the present invention provides a method for preparing porous inorganic particles, the method comprising the steps of:

(a) preparing an emulsion comprising an inorganic precursor and a polar solvent;

(b) adding an organic solvent to the emulsion of step (a) to swell emulsion particles;

(c) mixing the swollen emulsion of step (b) with polymer particles having a positive charge on the surface thereof;

(d) adding a surfactant to the mixture of step (c) and removing the organic solvent;

(e) adding an initiator to the result of step (d) to polymerize the same; and (f) firing the result of step (e) to remove the polymer particles so as to form macropores.

Advantageous Effects of Invention

In one aspect, the present invention can provide a method for preparing porous inorganic particles which are uniform and regular in pore size and pore arrangement.

In another aspect, the present invention can provide a method for preparing spherical porous inorganic particles which are uniform and regular in pore size and pore arrangement.

In another aspect, the present invention can provide a method for preparing porous inorganic particles including pores whose size can be adjusted without deformation in the spherical shape of the particles formed.

In another aspect, the present invention can provide a method for preparing porous inorganic particles including macropores of 50 nm or more.

In another aspect, the present invention can provide a method for preparing spherical porous inorganic particles including macropores of 50 nm or more which are uniformly arranged.

In another aspect, the present invention can provide a method for preparing spherical porous inorganic particles including macropores having a uniform pore size of 50 nm or more.

In another aspect, the present invention can provide a method for preparing spherical porous inorganic particles that allow to adjust the wavelength region of the light to be absorbed or reflected, based on the size of the pores.

In another aspect, the present invention can provide a method for preparing spherical porous inorganic particles that can reflect light in the visible light region as well as UV radiation, by adjusting the distance between the pore centers.

In another aspect, the present invention can provide a method for preparing porous inorganic particles capable of effectively reflecting ultraviolet radiation.

In another aspect, the present invention can provide a method for preparing porous inorganic particles with no phototoxicity.

DESCRIPTION OF EMBODIMENTS

Embodiments

Figure 1:
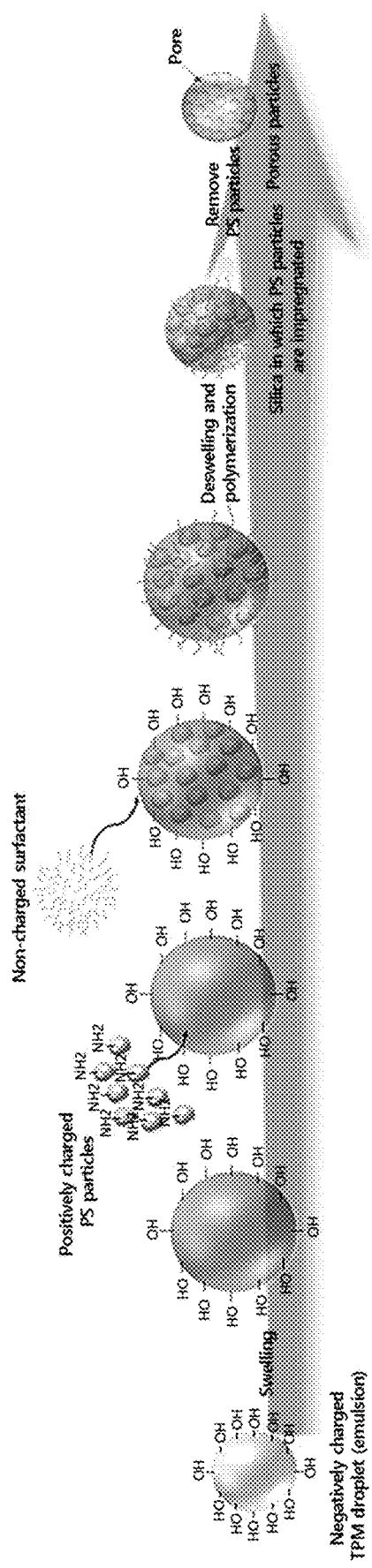
FIG. 1 is a schematic diagram of a method for preparing porous inorganic particles according to one embodiment of the present invention.

Hereinafter, embodiments of the present invention will be described in detail with reference to the accompanying drawings. This invention may, however, be embodied in many different forms and should not be construed as limited to the embodiments set forth herein. Rather, these embodiments are provided so that this disclosure will be thorough and complete and fully convey the spirit of the invention to those skilled in the art. The width, thickness, etc. of the elements in the drawings may be slightly exaggerated in order to clearly illustrate each element. In addition, only part of the elements may be illustrated for convenience of explanation. However, those skilled in the art could easily conceive the rest of the elements. Also, those skilled in the art could embody the spirit of the present invention in various other forms without departing from the spirit and scope of the invention.

In one embodiment, the present invention provides a method for preparing porous inorganic particles.

The preparation method according to the present embodiment may comprise the following steps:

(a) preparing an emulsion comprising an inorganic precursor and a polar solvent;

(b) adding an organic solvent to the emulsion of step (a) to swell emulsion particles;

(c) mixing the emulsion comprising swollen emulsion particles of step (b) with polymer particles having a positive charge on the surface thereof;

(d) adding a surfactant to the mixture of step (c) and removing the organic solvent;

(e) adding an initiator to the result of step (d) to polymerize the same; and (f) firing the result of step (e) to remove the polymer particles so as to form macropores.

Each step of the preparation method according to the present embodiment will be described below.

(a) Preparing an Emulsion Comprising an Inorganic Precursor and a Polar Solvent

An emulsion may be prepared by adding an inorganic precursor to a polar solvent.

The inorganic precursor is a precursor for forming porous inorganic particles. It may be a silica ($SiO_2$) precursor, a titanium dioxide ($TiO_2$) precursor, or a mixture thereof. The inorganic precursor forms emulsion particles in an emulsion.

The silica precursor may be a silicon alkoxide compound, for example, a silicon alkoxide having a polymerizable structure, for example, 3-(trimethoxysilyl)propyl methacrylate (TPM), 3-(diethoxy(methyl)silyl)propyl methacrylate, 3-(dimethoxy(methyl)silyl)propyl methacrylate, phenyl triethoxysilane (PTES), phenyl trimethoxysilane (PTMS), diphenyl diethoxysilane (DDES), and diphenyl dimethoxysilane (DDMS).

In one example, the silica precursor may be, for example, a silicon alkoxide having a methacrylate group, for example, 3-(trimethoxysilyl)propyl methacrylate (TPM), 3-(diethoxy(methyl)silyl)propyl methacrylate, and 3-(dimethoxy(methyl)silyl)propyl methacrylate. The use of a silicone alkoxide having a methacrylate group allows to prepare an emulsion comprising emulsion particles of a uniform size. In conventional methods for dispersing silica precursors using a homogenizer, the emulsion particles formed are various in size, and thus an additional process for removing particles is required to obtain a desired particle size. In contrast, when a silicon alkoxide having a methacryl group is used as a silica precursor, it is possible to form emulsion particles of a uniform size. In addition, the use of the silicon alkoxide as a silica precursor allows to obtain porous inorganic particles of a uniform size without a process for removing particles, so that it is possible to obtain porous inorganic particles with high efficiency per amount of the silica precursor added. Simultaneously with the addition of the silica precursor into a polar solvent, the methacrylate group is hydrolyzed, and a hydrophilic group is located on the outer side of the interface of emulsion particles and a methacrylate group, which is hydrophobic, is located on the inner side of emulsion particles. Due to these structural characteristics, when a silica precursor having a methacrylate group is additionally added, the silica precursor is stably introduced into emulsion particles, which makes it possible to adjust the size of emulsion particles without deformation in the shape of the particles. Therefore, it is possible to adjust the size of porous particles through repetitive addition of a silica precursor.

A titanium alkoxide may be used as the titanium dioxide precursor. Examples of the titanium alkoxide include, but not limited to, titanium methacrylate triisopropoxide.

The polar solvent may be water (distilled water), ethanol, methanol or a mixture thereof.

In one example, the emulsion may further comprise a catalyst in addition to the inorganic precursor and the polar solvent. The catalyst may be an acid catalyst or a base catalyst, for example, ammonia, hydrochloric acid, NaOH or a mixture thereof.

The emulsion may be prepared using a sol-gel method. An emulsion comprising emulsion particles having a negative charge and a uniform size may be prepared by adding a catalyst and an inorganic precursor to a polar solvent and stirring the resultant. Preparation of the emulsion may include, for example, stirring at room temperature for 2 to 10 hours, for example, 3 to 5 hours.

(b) Adding an Organic Solvent to the Emulsion of Step (a) to Swell Emulsion Particles An organic solvent may be added to the emulsion prepared in step (a) to swell emulsion particles. Swelling of the emulsion particles enables a large amount of polymer particles to be impregnated into the emulsion particles, and allows to form macropores uniformly arranged.

The organic solvent may be, for example, toluene, tetrahydrofuran, decane, octanol or a mixture thereof. For example, given the ease of removal of the organic solvent, those with a low boiling point may be preferable.

In order to swell emulsion particles to the extent that the polymer particles can be sufficiently impregnated into the emulsion particles, the weight ratio of the inorganic precursor to the organic solvent may be 1:1 to 1:2, for example, 1:1.4. When the ratio is within this range, the emulsion particles can be swollen to the extent that the polymer particles can be sufficiently impregnated into the emulsion particles, and also the influence of the organic solvent on the charge of the emulsion can be removed.

(c) Mixing the Emulsion Comprising Swollen Emulsion Particles of Step (b) with Polymer Particles Having a Positive Charge on the Surface Thereof In this step, polymer particles having a positive charge on the surface thereof are impregnated into the emulsion particles swollen in step (b) by the electrical attraction between the emulsion particles having a negative charge and the polymer particles having a positive charge on the surface thereof.

The polymer particles having a positive charge on the surface thereof (hereinafter, "polymer particles") can be used as a template for forming macropores within porous inorganic particles.

The polymer particles used are polymer particles having a positive charge on the surface thereof, and which are not dissolved in or swollen by an organic solvent and can maintain the shape of the pores. For example, crosslinked polymer particles having a positive charge on the surface thereof may be used. The polymer particles may have a positive charge on the surface or in the whole particle.

In one example, the polymer particles may be polystyrene, polymethylmethacrylate, polyamide, or the like. The polymer particles may be those polymerized to have a positive charge or those whose surface is treated to be positively charged.

In one example, the polymer particles may be polystyrene crosslinked using divinylbenzene (DVB). For example, the polystyrene used may be prepared by adding styrene, divinylbenzene, and an initiator dispersed in distilled water, and performing an emulsifier-free polymerization method. The initiator may be, for example, 2'-azobis(2-methylpropionamidine) dihydrochloride, and the polymerization may be performed with stirring at 60-90° C., for example, 80° C., for 15 hours or more, for example, 19 hours or more, although not limited thereto.

In one example, the weight ratio of the inorganic precursor to the polymer particle may be 1:0.12 to 1:2, for example 1:0.12 to 1:1, for example 1:1. When the ratio is within this range, pores can be stably formed in the particles.

The polymer particles may have an average particle diameter of 50 nm to 500 nm, for example, 100 nm to 400 nm, in order for them to be used as a template for forming macropores. The average particle diameter means the average value of the diameters in a single particle.

In one example, it is possible to adjust the pore density of the porous particles by adjusting the amount of the polymer particles, or it is possible to form open cell porous particles or closed cell porous particles. In another example, the closed cell may be formed by coating a shell on the surface of the prepared porous particles.

(d) Adding a Surfactant to the Mixture Obtained in Step (c) and Removing the Organic Solvent In order to prevent the fusion of the emulsion particles due to electrical attraction between the silica precursor emulsion particles impregnated with the polymer particles, a surfactant may be added for stabilization.

The surfactant may be, for example, a non-charged, nonionic surfactant. In one example, a nonionic surfactant having both a hydrophobic group and a hydrophilic group may be used. In one example, the nonionic surfactant may be polyethylene oxide-polypropylene oxide copolymers, polyethylene oxide-polypropylene oxide-polyethylene oxide triblock copolymers, polyvinylpyrrolidone, polyoxyethylene alkyl ethers, polyoxyethylene sorbitan monolaurates or a mixture thereof, although not limited thereto. For example, the nonionic surfactant may be Pluronic P-123 (SigmaAldrich), Pluronic P-103 (SigmaAldrich), Pluronic P-105 (SigmaAldrich), Pluronic F-127 (SigmaAldrich), Pluronic F-108 (SigmaAldrich), Pluronic F-108 (SigmaAldrich), Brij 72 (SigmaAldrich), Span 20 (SigmaAldrich), Tween 80 (SigmaAldrich), Tween 20 (SigmaAldrich), etc., although not limited thereto.

Removal of the organic solvent may be performed through heating and stirring, and the heating temperature may be, for example, 50 to 80° C., for example, 60 to 80° C. When the temperature is within this range, the organic solvent can be removed without affecting the shape of the polymer particles. If the temperature exceeds 80° C., the polymer particles may melt. The stirring may be performed, for example, for about 12 hours or more.

(e) Adding an Initiator to the Result of Step (d) to Polymerize the Same

Inorganic particles may be formed by polymerizing the emulsion which has gone through the stabilization and the removal of the organic solvent. The inorganic particles are prepared by polymerization before the polymer particles are removed by firing, and thus the polymer particles do not congregate and fuse together, but are arranged in a uniform distribution, so that the pores in the porous particles can be uniformly distributed. In addition, pores are uniformly formed even inside the particles, thus allowing to prepare porous inorganic particles that reflect light of a desired wavelength.

The initiator may be 2,2'-azobis(isobutyronitrile), benzoyl peroxide (BPO), potassium persulfate (KPS) or a mixture thereof.

The polymerization may be performed by adding the initiator and then heating the resultant at a temperature of 60 to 90° C. for 3 hours or more, for example, 5 hours or more.

(f) Firing the Result of Step (e) to Remove the Polymer Particles so as to Form Macropores The polymerized particles may be fired to remove the polymer particles and thereby to form macropores in the portion of the polymer particles.

The firing may be performed, for example, at a temperature of 500 to 750° C. for 1 to 10 hours, for example, at 600° C. for 3 hours. In one example, the firing may be performed at a temperature increase rate of 1° C./minute, although not limited thereto.

The pore size can be adjusted by the particle size of the polymer particles, and macropores having a uniform size and an average diameter of 50 nm to 500 nm, for example, 100 nm to 400 nm, can be formed. The average particle diameter means the average value of the diameters in a single particle.

In one example, when the polymer particles used are crosslinked, uncrosslinked polymer particles may be removed by using the organic solvent.

In another embodiment of the present invention, the present invention relates to a method for preparing porous inorganic particles, the method comprising the steps of:

(a) synthesizing polymer particles having a positive charge on the surface thereof;

(b) preparing an emulsion comprising an inorganic precursor and a polar solvent;

(c) adding an organic solvent to the emulsion of step (b) to swell emulsion particles;

(d) mixing the swollen emulsion of step (c) with polymer particles having a positive charge on the surface thereof;

(e) adding a surfactant to the mixture of step (d) and removing the organic solvent;

(f) adding an initiator to the result of step (e) to polymerize the same; and (g) firing the result of step (f) to remove the polymer particles so as to form macropores.

Details of this method are the same as described for the method for preparing porous inorganic particles according to the aforementioned embodiment of the present invention, except that this method further comprises the step (a) of synthesizing polymer particles.

The step (a) of synthesizing polymer particles of the present embodiment is the same as described for step (c) of the method for preparing porous inorganic particles according to the aforementioned embodiment of the present invention According to the embodiments of the present invention, it is possible to form porous inorganic particles of a uniform size, and thus a separate process for removing particles of an undesirable size is not required, unlike the conventional cases where a homogenizer is used, so that the present invention is advantageous for mass production.

In addition, the present invention has an advantage of less loss of the inorganic precursor used and high efficiency in the formation of inorganic particles from the inorganic precursor.

The porous inorganic particles prepared according to the embodiments of the present invention can have macropores uniformly distributed even inside the particles and have a uniform pore size. Therefore, it is possible to provide porous inorganic particles having excellent optical properties and capable of preventing multiple scattering. In addition, the present invention allows to adjust the size of the macropores, and thus it is possible to prepare porous inorganic particles that reflect light of a desired wavelength. Furthermore, the present invention allows to form pores uniformly even inside the particles, and thus enables to prepare porous inorganic particles that strongly reflect only a specific desired wavelength.

Porous inorganic particles prepared according to the embodiments of the present invention are applicable to various fields such as photonic crystals or UV yarn materials, and $CO_2$ adsorption materials.

EXAMPLES

Hereinafter, the present invention will be described in detail by way of examples, comparative examples and test examples. It will be apparent to those skilled in the art that they are provided for illustrative purposes only to describe the present invention more specifically, and the scope of the present invention is not limited by these examples, comparative examples and test examples.

Preparation Example 1: Preparation of Polymer Particles Having a Positive Charge (Average Particle Diameter: 240 nm)

675 g of distilled water, 37.2 g of styrene, and 1.86 g of divinylbenzene were placed in a double jacket reactor, followed by mixing at 80° C. for 1 hour. Then, a 2'-azobis (2-methylpropionamidine) dihydrochloride initiator dispersed in 12.5 ml of distilled water was introduced under nitrogen atmosphere by using a syringe, followed by stirring at 80° C. for 19 hours or more to prepare polystyrene having a positive charge and a uniform average particle diameter of 240 nm.

Preparation Example 2: Preparation of Polymer Particles Having a Positive Charge (Average Particle Diameter: 110 nm)

190 g of distilled water, 1.52 g of styrene, and 0.0304 g of divinylbenzene were placed in a double jacket reactor, followed by mixing at 80° C. for 1 hour. Then, a 2'-azobis (2-methylpropionamidine) dihydrochloride initiator dispersed in 12.5 ml of distilled water was introduced under nitrogen atmosphere by using a syringe, followed by stirring at 90° C. for 24 hours or more to prepare polystyrene having a positive charge and a uniform average particle diameter of 110 nm.

Example 1: Preparation of Porous Inorganic Particles

The porous inorganic particles of Example 1 were prepared according to the method schematically shown in FIG. 1. Specific steps are described below.

Figure 2:
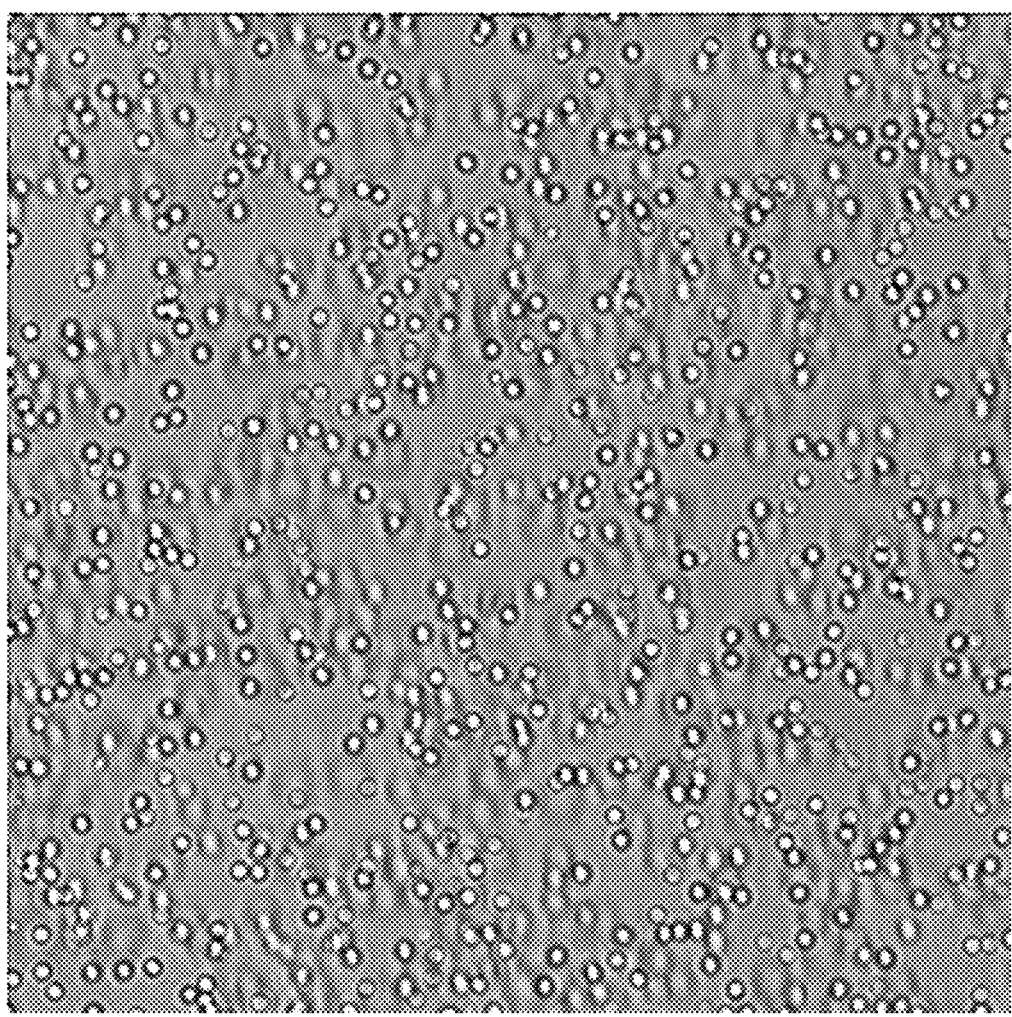
FIG. 2 is a photomicrograph (magnification: ×100) of the emulsion particles of the emulsion formed before swelling, of step (a) of Example 1 of the present invention.
Figure 3:
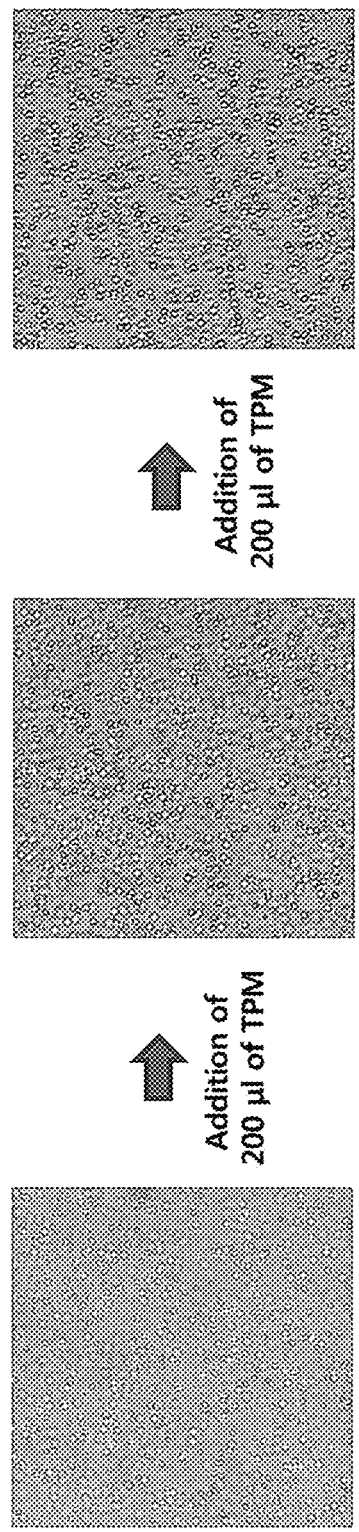
FIG. 3 is photomicrographs showing the changes in the emulsion particle size according to the stepwise addition of a silica precursor in step (a) of Example 1 of the present invention.

(a) Preparation of Emulsion and Swelling of Emulsion Particles 40 ml of distilled water and 20 µl of ammonia were placed in a flask and then mixed. 200 µl of 3-(trimethoxysilyl) propyl methacrylate (TPM) was added thereto every 30 minutes, 4 times, with stirring to prepare a negatively charged emulsion. FIG. 2 shows a photomicrograph of the emulsion, which indicates that emulsion particles of a uniform size were formed. Thereafter, 1.5 ml of toluene was added thereto to swell the emulsion particles.

(b) Addition of Polymer Particles

After addition of 40 ml of distilled water, 24 ml of polystyrene having a positive charge prepared in Preparation Example 1 was added to the negatively charged emulsion prepared in step (a), in order to impregnate polystyrene particles into the emulsion particles.

(c) Stabilization and Removal of Organic Solvent 1.2 ml of a 5 wt % polyethylene oxide-polypropylene oxide-polyethylene oxide triblock copolymer was added, to stabilize the emulsion particles including polystyrene therein, followed by stirring for 10 minutes. Then, the mixture was stirred at 60° C. for 12 hours or more to remove toluene.

(d) Polymerization of Silica 0.2 g of 2,2'-azobis(isobutyronitrile) was added to the result of step (c), followed by heating at 80° C. for 5 hours to polymerize silica.

(e) Firing

After washing the particles prepared in step (d), the particles were subjected to firing for 3 hours at 600° C. to remove organic materials and prepare inorganic particle including pores.

Figure 4:
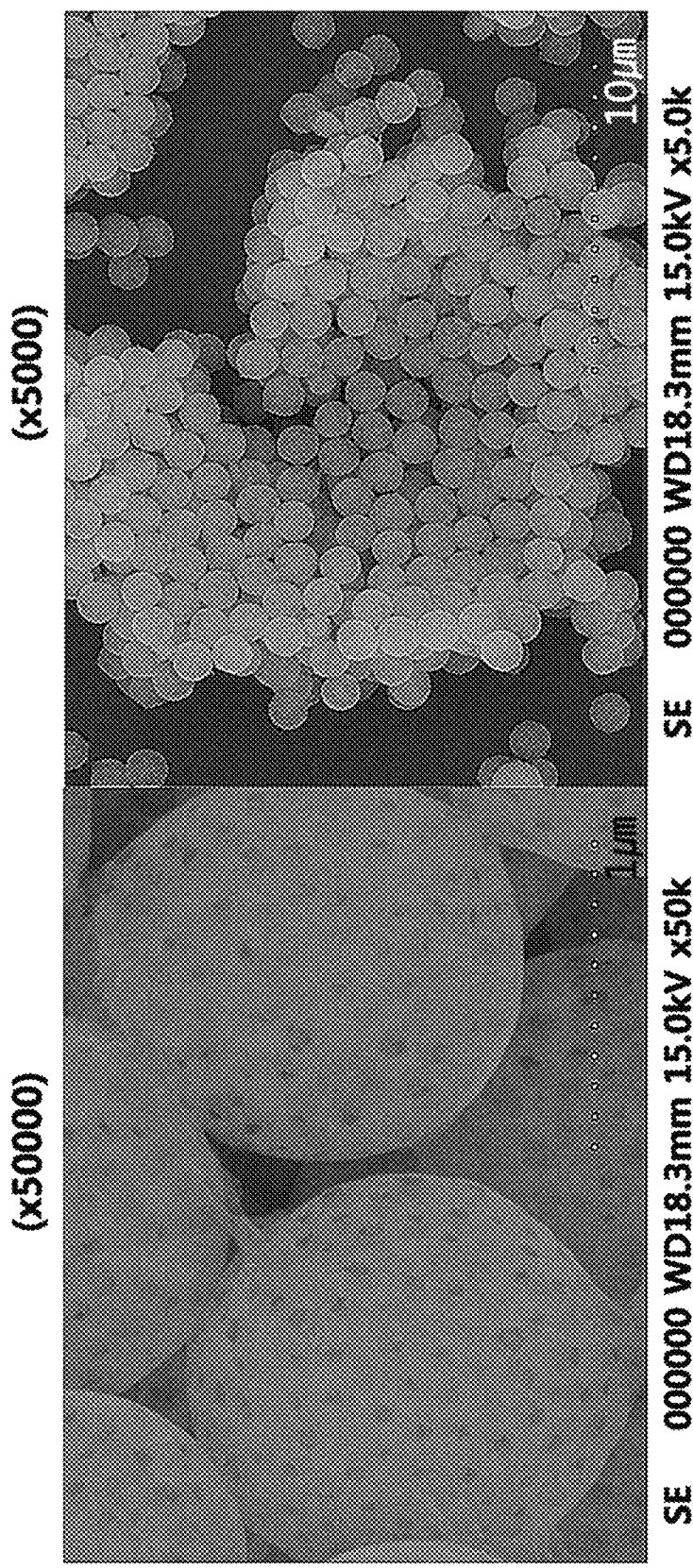
FIG. 4 is scanning electron microphotographs of the porous inorganic particles prepared according to Example 1 of the present invention (left photo magnification: 50000 times, right photo magnification: 5000 times).
Figure 5:
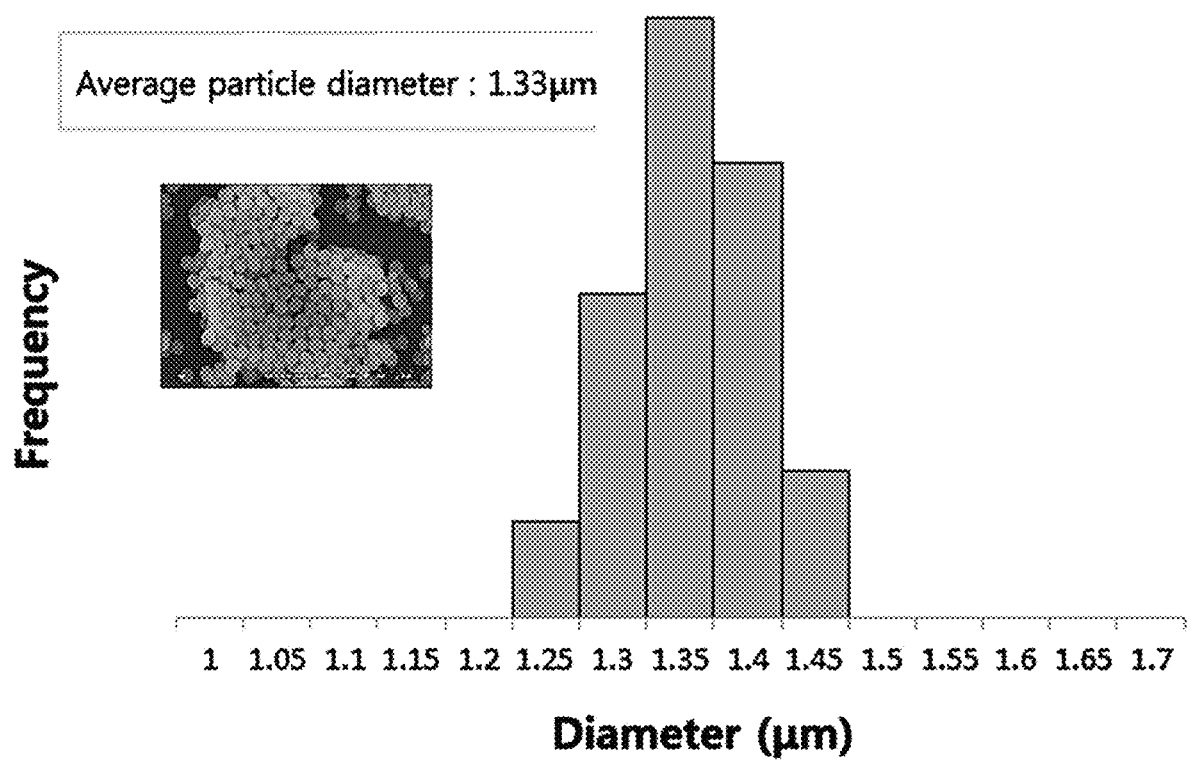
FIG. 5 is a graph showing the particle size distribution of the porous inorganic particles prepared according to Example 1 of the present invention.
Figure 6:
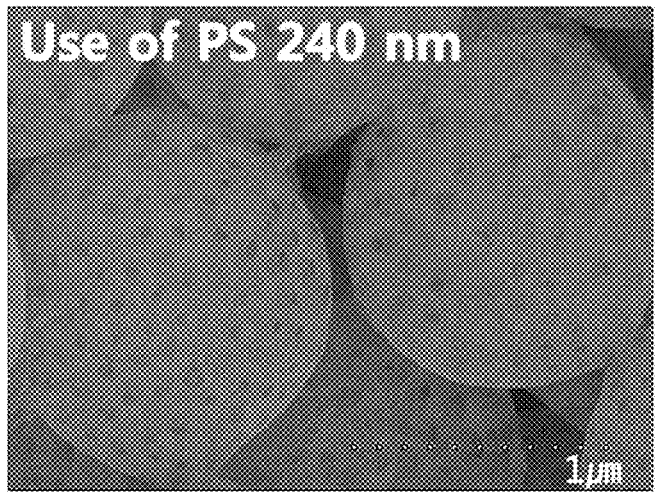
FIG. 6 is transmission electron microphotographs of the porous inorganic particles prepared according to Example 1 of the present invention.
Figure 6:
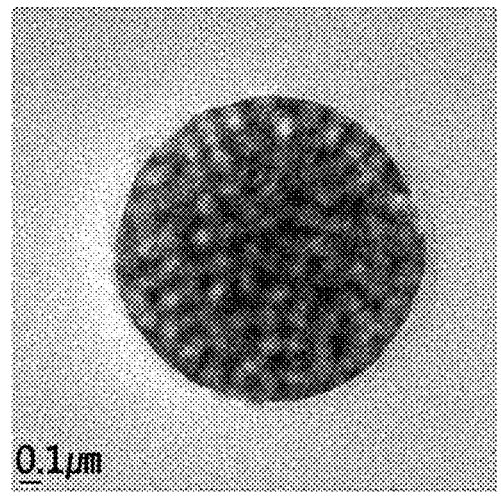

The prepared particles have a uniform size as shown in FIG. 4 and FIG. 5, and have a uniformity in average particle size as indicated by a standard deviation of 0.05. In addition, as shown in FIG. 6, the prepared particles are porous particles including pores therein.

Example 2: Preparation of Porous Inorganic Particles

Porous inorganic particles were prepared in the same manner as in Example 1, except that polystyrene particles having an average particle diameter of 110 nm prepared in Preparation Example 2 were used as the polymer particles.

Figure 7:
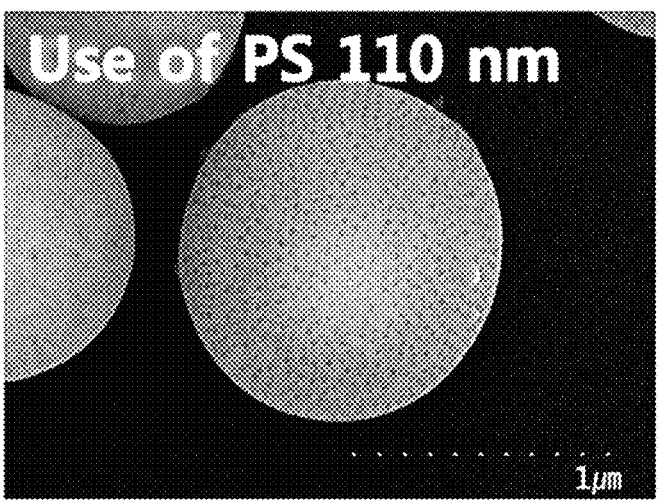
FIG. 7 is transmission electron microphotographs of the porous inorganic particles prepared according to Example 2 of the present invention.
Figure 7:
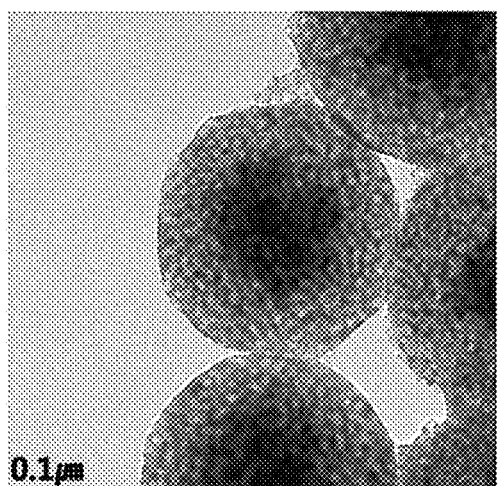

FIG. 7 shows transmission electron microphotographs of the porous inorganic particles prepared.

Example 3: Preparation of Closed Cell Porous Inorganic Particles 25 ml (5%) of porous inorganic particles prepared in the same manner as in Example 1 and 3.75 ml of vinyltrimethoxysilane (VTMS) were stirred for 24 hours under conditions of ammonia (17.5 ml) and water (750 ml) to prepare closed cell porous inorganic particles the surface of which were coated with a silica shell.

Figure 8:
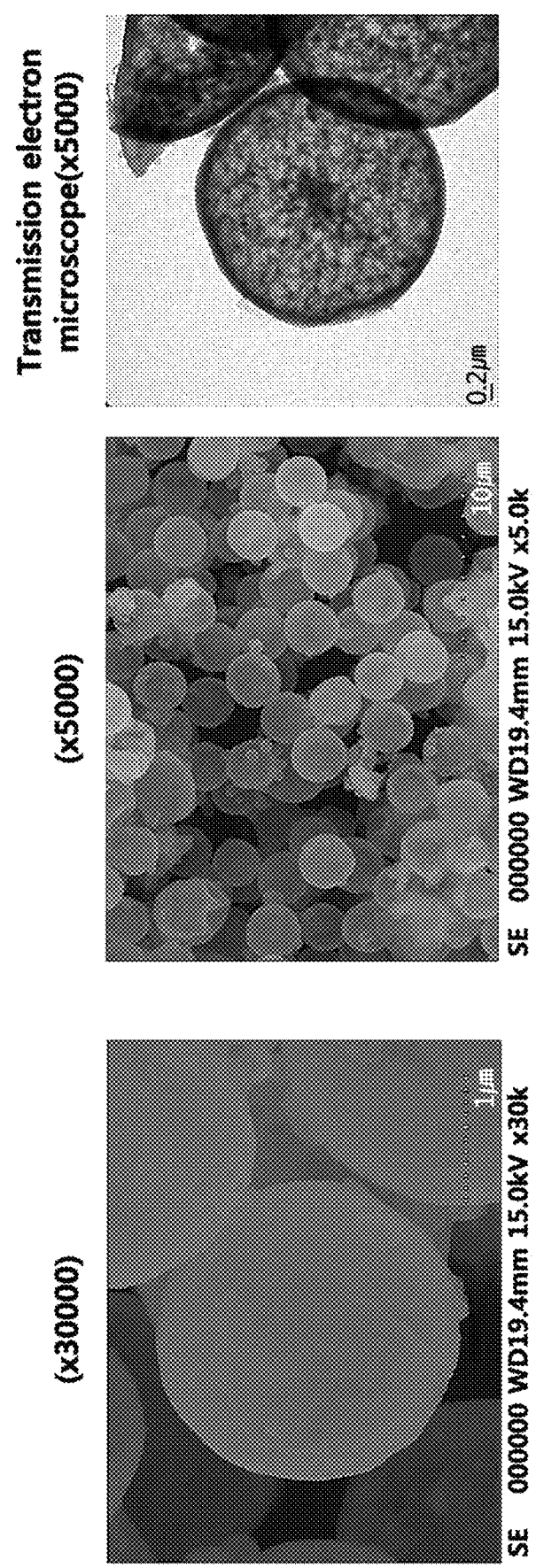
FIG. 8 is scanning electron microphotographs and a transmission electron microphotograph of the porous inorganic particles prepared according to Example 3 of the present invention. Starting from the left, there are provided a ×30000 magnification scanning electron microphotograph, a ×5000 magnification scanning electron microphotograph, and a ×5000 magnification transmission electron microphotograph.

As shown in FIG. 8, closed cell porous inorganic particle having a uniform size and which do not have pores exposed on the surface thereof were obtained. The pore size was 190 nm to 200 nm.

Test Example 1: Measurement of Reflection Wavelength of Porous Inorganic Particles The porous inorganic particles prepared according to Example 3 were analyzed with a reflecting microscope to determine the reflection wavelength of the particles.

Figure 9:
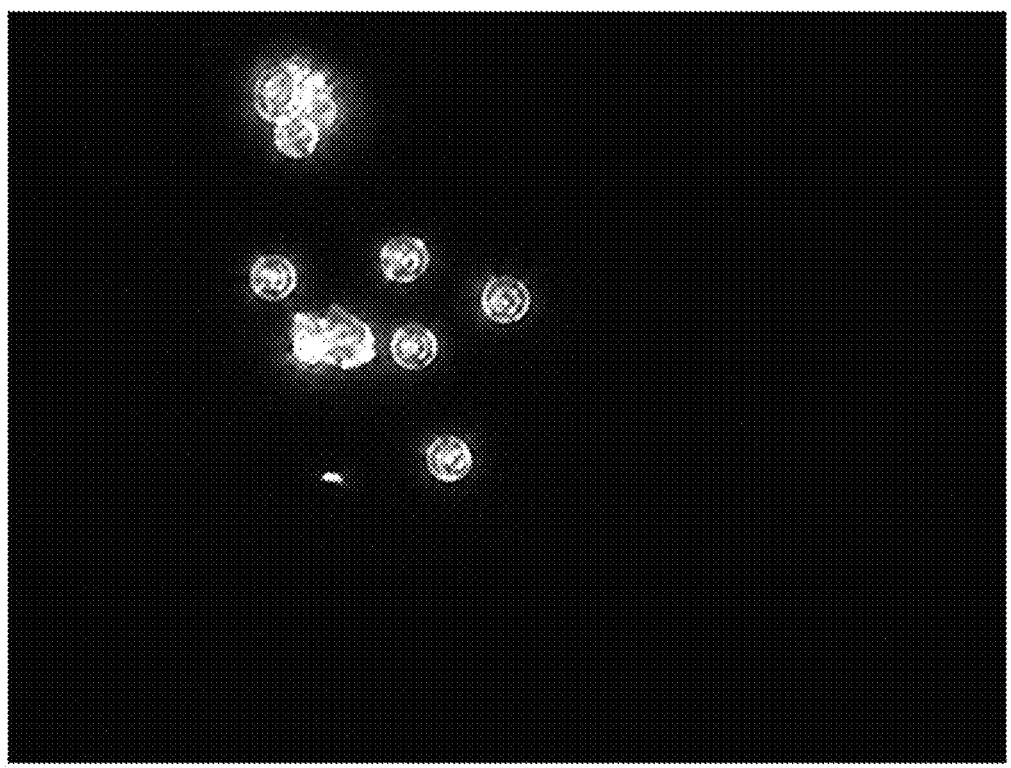
FIG. 9 is a dark field image of a reflecting microscope of the porous inorganic particles prepared according to Example 3 of the present invention.
Figure 10:
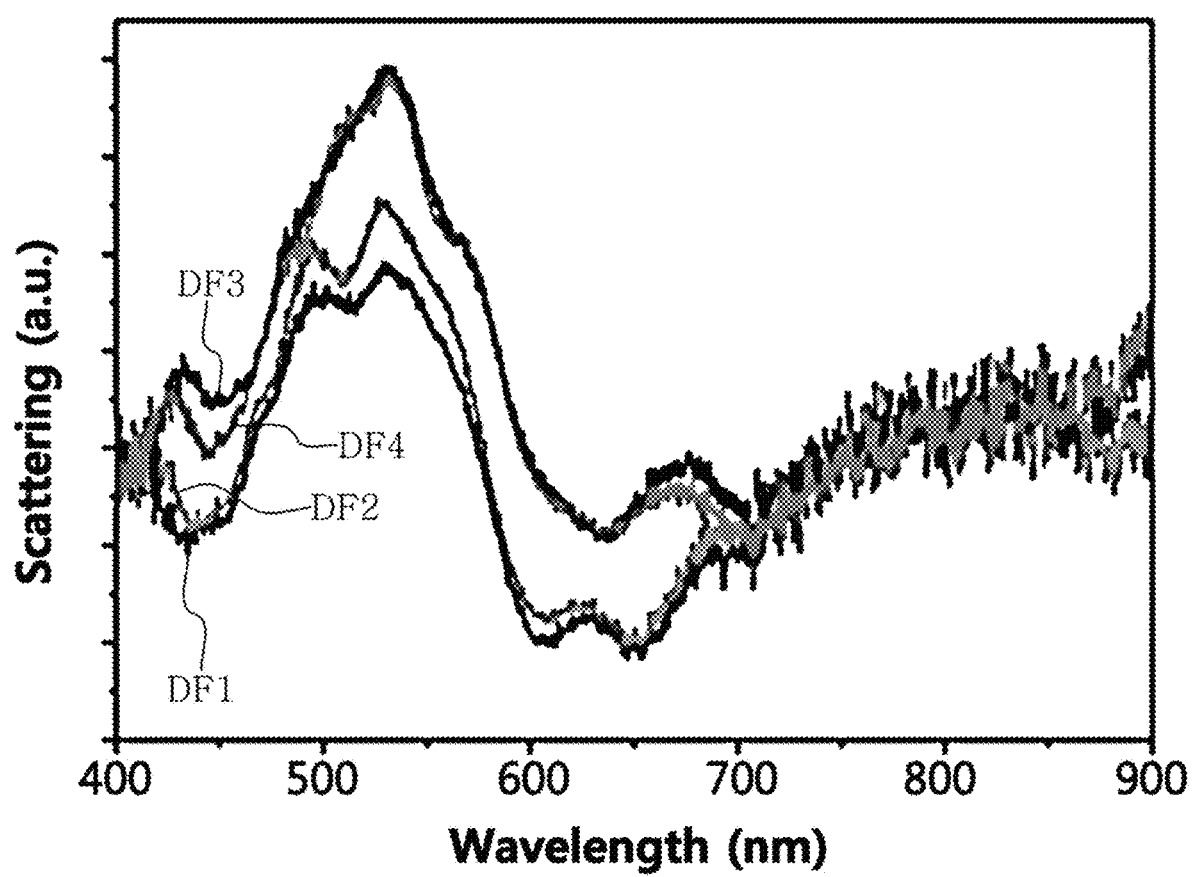
FIG. 10 is a scattering data log of the porous inorganic particles prepared according to Example 3 of the present invention. DF1 to DF4 denote measurement positions (up, down, left, right).

From the results of FIG. 9 and FIG. 10, it can be seen that the particles reflect wavelengths of about 500 to 550 nm. In particular, the particles uniformly reflect light in the same wavelength region, regardless of the scattering data measurement positions DF1 to DF4 of FIG. 10, which shows that the particles are porous particles having pores uniformly and regularly arranged.

Comparative Example 1: Preparation of Porous Inorganic Particles Prepared without Swelling Step The porous inorganic particles of Comparative Example 1 were prepared in the same manner as in Example 1, but without the addition of toluene in step (a).

Figure 11:
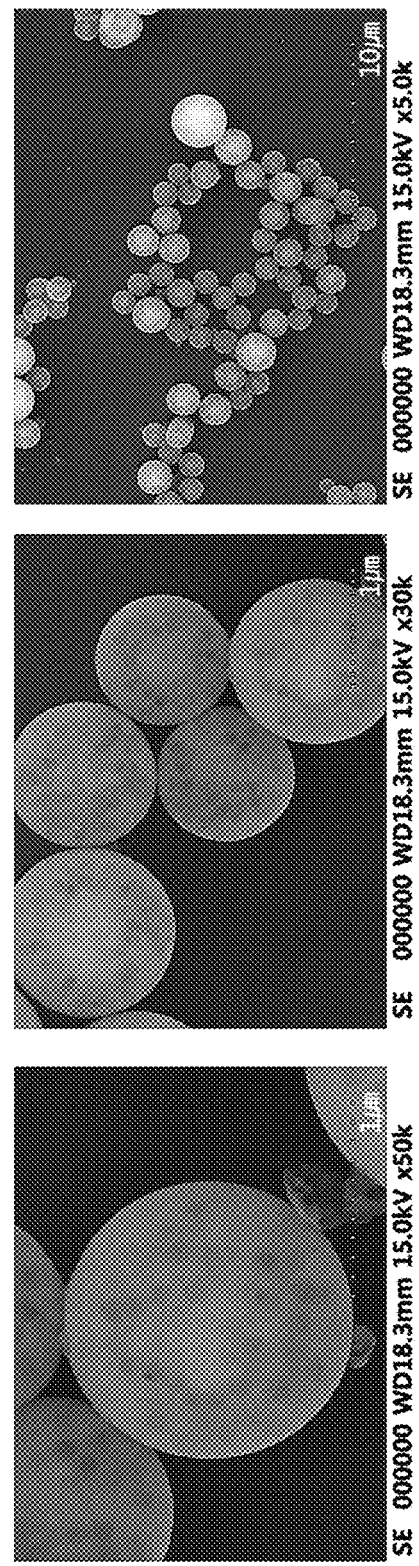
FIG. 11 is photomicrographs of the porous inorganic particles prepared according to Comparative Example 1 of the present invention. Starting from the left, there are provided ×50000 magnification, ×30000 magnification, and ×5000 magnification photos.

The results of FIG. 11 show that the polymer particles were not sufficiently impregnated into the inorganic precursor so that pores uniformly arranged were not formed.

Comparative Example 2: Preparation of Porous Inorganic Particles Prepared without Polymerization Step Before Firing The porous inorganic particles of Comparative Example 2 were prepared in the same manner as in Example 1, except that tetraethyl orthosilicate (TEOS) was used as the inorganic precursor, and in step (a), the silica precursor was dispersed using a homogenizer without addition of toluene, and that silica was gelled without the step (d) of polymerization of silica and then fired.

Figure 12:
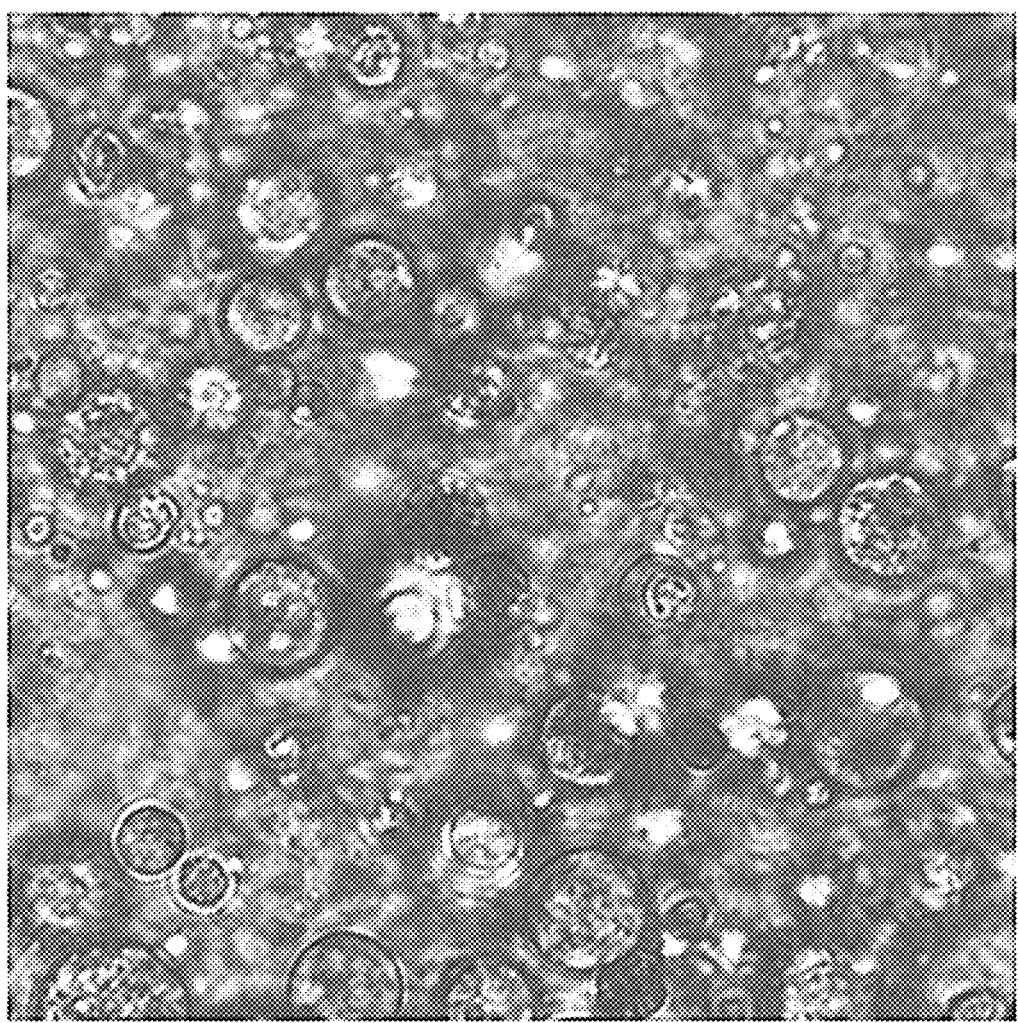
FIG. 12 is a photomicrograph (magnification: ×100) showing the emulsion particles of the emulsion before addition of polymers in Comparative Example 2 of the present invention.

FIG. 12 provides a photomicrograph of the emulsion particles of the emulsion prepared in step (a), which shows that the size of the emulsion particles, which determines the size of the porous particles, is nonuniform. Thus, in Comparative Example 2, it is difficult to form porous inorganic particles having a uniform size.

The invention claimed is:

1. A method for preparing porous inorganic particles, the method comprising the steps of:
    (a) preparing an emulsion containing emulsion particles, each emulsion particle comprising a precursor of the porous inorganic particles and a polar solvent;
    (b) swelling the emulsion particles by adding an organic solvent to the emulsion of step (a);

(c) mixing the swollen emulsion particles of step (b) with polymer particles having a positive charge on surface thereof to produce a mixture containing polymer particles-impregnated swollen emulsion particles;

(d) adding a surfactant to the mixture of step (c) and removing the organic solvent;

(e) adding an initiator to resulting mixture of step (d) to polymerize the precursor of the porous inorganic particles to form polymerized inorganic particles comprising the polymer particles impregnated therein; and (f) firing polymerized inorganic particles of step (e) to remove the polymer particles so as to form the porous inorganic particles.

2. The preparation method according to claim 1, wherein the polar solvent is selected from the group consisting of water, ethanol, and methanol, and a combination thereof.

3. The preparation method according to claim 1, wherein the organic solvent is selected from the group consisting of toluene, tetrahydrofuran, decane, octanol, and a combination thereof.

4. The preparation method according to claim 1, wherein the polymer particles having a positive charge on the surface thereof are selected from the group consisting of polystyrene, polymethylmethacrylate, polyamide, and a combination thereof.

5. The preparation method according to claim 1, wherein the surfactant is a nonionic surfactant.

6. The preparation method according to claim 5, wherein the nonionic surfactant is selected from the group consisting of polyethylene oxide-polypropylene oxide copolymers, polyethylene oxide-polypropylene oxide-polyethylene oxide triblock copolymers, polyvinylpyrrolidone, polyoxyethylene alkyl ethers, polyoxyethylene sorbitan monolaurates, and a combination thereof.

7. The preparation method according to claim 1, wherein the removal of the organic solvent of step (d) comprises stirring at a temperature of 60 to 80° C.

8. The preparation method according to claim 1, wherein the initiator is selected from the group consisting of 2,2'-azobis(isobutyronitrile), benzoyl peroxide (BPO), and potassium persulfate (KPS), and a combination thereof.

9. The preparation method according to claim 1, wherein the polymerization of step (e) is performed at 60 to 90° C.

10. The preparation method according to claim 1, wherein the firing of step (f) is performed at 500 to 750° C.

11. The preparation method according to claim 1, wherein the precursor of the porous inorganic particles is a silica ($SiO_2$) precursor or a titanium dioxide ($TiO_2$) precursor.

12. The preparation method according to claim 11, wherein the precursor the porous inorganic particles is a silica precursor having a methacrylate group.

13. The preparation method according to claim 1, wherein the emulsion containing emulsion particles of step (a) further comprises a catalyst.

14. The preparation method according to claim 13, wherein the catalyst is an acid catalyst or a base catalyst.

* * * * *